(12) United States Patent
Mironov et al.

(10) Patent No.: US 11,324,256 B2
(45) Date of Patent: *May 10, 2022

(54) AEROSOL GENERATING SYSTEM WITH MULTIPLE INDUCTOR COILS

(71) Applicant: Philip Morris Products S.A., Neuchatel (CH)

(72) Inventors: Oleg Mironov, Cudrefin (CH); Jerome Christian Courbat, Cortaillod (CH); Tony Reevell, London (GB); Enrico Stura, Palezieux-Village (CH)

(73) Assignee: Philip Morris Products S.A., Neuchatel (CH)

( * ) Notice: Subject to any disclaimer, the term of this patent is extended or adjusted under 35 U.S.C. 154(b) by 83 days.

This patent is subject to a terminal disclaimer.

(21) Appl. No.: 16/836,402

(22) Filed: Mar. 31, 2020

(65) Prior Publication Data

US 2020/0221775 A1 Jul. 16, 2020

Related U.S. Application Data

(62) Division of application No. 16/637,470, filed as application No. PCT/EP2018/071710 on Aug. 9, 2018.

(30) Foreign Application Priority Data

Aug. 9, 2017 (EP) .................................... 17185588

(51) Int. Cl.
*A24F 13/00* (2006.01)
*A24F 40/44* (2020.01)
(Continued)

(52) U.S. Cl.
CPC ............ *A24F 40/44* (2020.01); *A24B 15/167* (2016.11); *A24D 1/045* (2013.01); *A24D 1/20* (2020.01);
(Continued)

(58) Field of Classification Search
CPC ...................................................... A24F 47/00
(Continued)

(56) References Cited

U.S. PATENT DOCUMENTS

| 5,613,505 A | 3/1997 | Campbell et al. |
| 10,945,456 B2* | 3/2021 | Mironov ................. A24F 40/57 |

(Continued)

FOREIGN PATENT DOCUMENTS

| CN | 206227716 U | 6/2017 |
| CN | 108338421 A | 7/2018 |

(Continued)

OTHER PUBLICATIONS

Japanese Office Action dated Jan. 7, 2021 in Japanese Patent Application No. 2020-109401 (with English translation), 13 pages.

(Continued)

*Primary Examiner* — Phuong K Dinh
(74) *Attorney, Agent, or Firm* — Oblon, McClelland, Maier & Neustadt, L.L.P.

(57) ABSTRACT

An aerosol-generating device is provided, including a housing having a chamber configured to receive at least a portion of an aerosol-forming article; a first coil disposed at least partially around, or adjacent to, the chamber; and a second coil disposed at least partially around, or adjacent to, the chamber, the first coil being part of a first resonant circuit having a first resonant frequency and the second coil forming part of a second resonant circuit having a second resonant frequency.

30 Claims, 7 Drawing Sheets

(51) Int. Cl.
  *A24F 40/46* (2020.01)
  *A24B 15/167* (2020.01)
  *A24F 40/465* (2020.01)
  *A24F 40/57* (2020.01)
  *A24D 1/20* (2020.01)
  *A24D 1/04* (2006.01)
  *H05B 1/02* (2006.01)
  *H05B 6/10* (2006.01)
  *H05B 6/44* (2006.01)
  *A24F 40/50* (2020.01)
  *A24F 40/48* (2020.01)
  *A24F 40/20* (2020.01)

(52) U.S. Cl.
  CPC ............ *A24F 40/46* (2020.01); *A24F 40/465* (2020.01); *A24F 40/50* (2020.01); *A24F 40/57* (2020.01); *H05B 1/0297* (2013.01); *H05B 6/108* (2013.01); *H05B 6/44* (2013.01); *A24F 40/20* (2020.01); *A24F 40/48* (2020.01)

(58) Field of Classification Search
  USPC .................................................. 131/328–329
  See application file for complete search history.

(56) References Cited

U.S. PATENT DOCUMENTS

| | | |
|---|---|---|
| 2004/0149737 A1 | 8/2004 | Sharpe et al. |
| 2014/0360515 A1 | 12/2014 | Vasiliev et al. |
| 2015/0320116 A1 | 11/2015 | Bleloch et al. |
| 2016/0021934 A1 | 1/2016 | Cadieux et al. |
| 2016/0120221 A1* | 5/2016 | Mironov ............... A24F 40/465 392/395 |
| 2016/0120225 A1 | 5/2016 | Mishra et al. |
| 2016/0331031 A1 | 11/2016 | Malgat et al. |
| 2017/0055580 A1 | 3/2017 | Blandino et al. |
| 2017/0055584 A1 | 3/2017 | Blandino et al. |
| 2017/0224015 A1 | 8/2017 | Basil et al. |
| 2018/0070639 A1 | 3/2018 | Chen et al. |
| 2018/0184712 A1 | 7/2018 | Fraser et al. |
| 2018/0289071 A1 | 10/2018 | Cadieux et al. |

FOREIGN PATENT DOCUMENTS

| | | |
|---|---|---|
| JP | 2013-509160 A | 3/2013 |
| JP | 2013-511962 A | 4/2013 |
| JP | 2017-515485 A | 6/2017 |
| JP | 2017-516256 A | 6/2017 |
| JP | 2010-500218 A | 1/2020 |
| JP | 2020-109401 A | 7/2020 |
| JP | 2020-109402 A | 7/2020 |
| RU | 2 604 012 C2 | 12/2015 |
| RU | 2611487 C2 | 2/2016 |
| RU | 2 600 912 C1 | 10/2016 |
| WO | WO 95/27411 A1 | 10/1995 |
| WO | WO 2014/048745 A1 | 4/2014 |
| WO | WO 2015/131058 A1 | 9/2015 |
| WO | WO 2015/175568 A1 | 11/2015 |
| WO | WO 2015/176898 A1 | 11/2015 |
| WO | WO 2015/177043 A1 | 11/2015 |
| WO | WO 2015/177044 A1 | 11/2015 |
| WO | WO 2015/177045 A1 | 11/2015 |
| WO | WO 2015/177046 A1 | 11/2015 |
| WO | WO 2015/177247 A1 | 11/2015 |
| WO | WO 2015/177252 A1 | 11/2015 |
| WO | WO 2015/177253 A1 | 11/2015 |
| WO | WO 2015/177254 A1 | 11/2015 |
| WO | WO 2015/177257 A1 | 11/2015 |
| WO | WO 2015/177263 A1 | 11/2015 |
| WO | WO 2015/177264 A1 | 11/2015 |
| WO | WO 2015/177265 A1 | 11/2015 |
| WO | WO 2015/198015 A1 | 12/2015 |
| WO | WO 2016/075436 A1 | 5/2016 |
| WO | WO 2016/090037 A1 | 6/2016 |
| WO | WO 2016/156500 A1 | 10/2016 |
| WO | WO 2016/184928 A1 | 11/2016 |
| WO | WO 2016/184929 A1 | 11/2016 |
| WO | WO 2016/184930 A1 | 11/2016 |
| WO | WO 2017/001816 A1 | 1/2017 |
| WO | WO 2017/001819 A1 | 1/2017 |
| WO | WO 2017/001820 A1 | 1/2017 |
| WO | WO 2017/005705 A1 | 1/2017 |
| WO | WO 2017/029268 A1 | 2/2017 |
| WO | WO 2017/029269 A1 | 2/2017 |
| WO | WO 2017/029270 A1 | 2/2017 |
| WO | WO 2017/036950 A2 | 3/2017 |
| WO | WO 2017/036951 A1 | 3/2017 |
| WO | WO 2017/036954 A1 | 3/2017 |
| WO | WO 2017/036955 A2 | 3/2017 |
| WO | WO 2017/036958 A2 | 3/2017 |
| WO | WO 2017/036959 A1 | 3/2017 |
| WO | WO 2017036957 A1 | 3/2017 |
| WO | WO 2017/064487 A1 | 4/2017 |
| WO | WO 2017/068092 A1 | 4/2017 |
| WO | WO 2017/068095 A1 | 4/2017 |
| WO | WO 2017/068098 A1 | 4/2017 |
| WO | WO 2017/068099 A1 | 4/2017 |
| WO | WO 2017/068100 A1 | 4/2017 |
| WO | WO 2017/072144 A1 | 5/2017 |
| WO | WO 2017/072145 A1 | 5/2017 |
| WO | WO 2017/072146 A1 | 5/2017 |
| WO | WO 2017/072148 A1 | 5/2017 |
| WO | WO 2017/072149 A1 | 5/2017 |
| WO | WO 2017/077503 A1 | 5/2017 |
| WO | WO 2017/085242 A1 | 5/2017 |
| WO | WO 2017/109448 A2 | 6/2017 |
| WO | 2018/073376 A1 | 4/2018 |
| WO | WO 2018/138072 A1 | 8/2018 |
| WO | 2018/206616 A1 | 11/2018 |
| WO | 2019/053268 A1 | 3/2019 |

OTHER PUBLICATIONS

Office Action dated Sep. 10, 2020 in corresponding Japanese Patent Application No. 2019-552875 (with English Translation), citing documents AO and AP therein, 8 pages.
International Search Report and Written Opinion dated Nov. 15, 2018 in PCT/EP2018/071710 filed Aug. 9, 2018.
Office Action dated Nov. 13, 2020 in co-pending U.S. Appl. No. 16/836,511, citing documents AA therein, 19 pages.
Extended European Search Report dated Jul. 20, 2020 in European Patent Application No. 20162709.8, citing documents AA therein, 9 pages.
Extended European Search Report dated Mar. 5, 2019 in European Patent Application No. 17185588.5, citing documents AA, AB, AC, AF and AG therein, 9 pages.
Notice of Allowance dated Jan. 22, 2021 in corresponding European Patent Application No. 20162710.6, 43 pages.
Office Action dated Sep. 10, 2020 in corresponding Japanese Patent Application No. 2020-109401 (with English Translation), citing documents AA, AO-AQ therein, 15 pages.
Office Action dated Sep. 14, 2020 in corresponding Japanese Patent Application No. 2020-109402 (with English Translation), citing documents AA, AO, AP and AR therein, 13 pages.
Combined Russian Office Action and Search Report dated Sep. 10, 2021 in Russian Patent Application No. 2020110016, citing documents AO therein, 11 pages.
Combined Russian Office Action and Search Report dated Sep. 23, 2021 in Russian Patent Application No. 2020110018, citing document AP therein, 12 pages.
Combined Russian Office Action and Search Report dated Nov. 26, 2021 in corresponding Russian Patent Application No. 2020109668 (with English translation), citing document AO therein, 11 pages.

* cited by examiner

AEROSOL GENERATING SYSTEM WITH MULTIPLE INDUCTOR COILS

CROSS-REFERENCE TO RELATED APPLICATIONS

This application is a divisional application of and claims the benefit of priority under 35 U.S.C. § 120 to U.S. application Ser. No. 16/637,470, filed on Feb. 7, 2020, which is a National State application of PCT/EP2018/071710, filed Aug. 9, 2018, and claims benefit of priority under 35 U.S.C. § 119 from European Patent Application No. 17185588.5, filed on Aug. 9, 2017, the entire contents of each of which are incorporated herein by reference.

TECHNICAL FIELD

The present invention relates to an aerosol-generating device. In particular, the invention relates to an aerosol-generating device having an inductive heater for heating an aerosol-generating article using a susceptor. The present invention also relates to an aerosol-generating system including such an aerosol-generating device in combination with an aerosol-generating article for use with the aerosol-generating device.

DESCRIPTION OF THE RELATED ART

A number of electrically-operated aerosol-generating systems in which an aerosol-generating device having an electric heater is used to heat an aerosol-forming substrate, such as a tobacco plug, have been proposed in the art. One aim of such aerosol-generating systems is to reduce known harmful smoke constituents of the type produced by the combustion and pyrolytic degradation of tobacco in conventional cigarettes. Typically, the aerosol-generating substrate is provided as part of an aerosol-generating article which is inserted into a chamber or cavity in the aerosol-generating device. In some known systems, to heat the aerosol-forming substrate to a temperature at which it is capable of releasing volatile components that can form an aerosol, a resistive heating element such as a heating blade is inserted into or around the aerosol-forming substrate when the aerosol-generating article is received in the aerosol-generating device. In other aerosol-generating systems, an inductive heater is used rather than a resistive heating element. The inductive heater typically comprises an inductor forming part of the aerosol-generating device and a conductive susceptor element arranged such that it is in thermal proximity to the aerosol-forming substrate. During use, the inductor generates a fluctuating magnetic field to generate eddy currents and hysteresis losses in the susceptor element, causing the susceptor element to heat up, thereby heating the aerosol-forming substrate.

In known systems having an inductor and a susceptor element, the heating effect provided by the inductor coil may be varied by controlling the current supplied to the inductor coil. For example, to reduce the time required for the susceptor element to reach the desired operating temperature, the current supplied to the inductor coil may be temporarily increased.

It would be desirable to provide an aerosol-generating device with improved control of the heating effect relative to known systems.

SUMMARY

According to a first aspect of the invention there is provided an aerosol-generating device comprising a housing having a chamber sized to receive at least a portion of an aerosol-forming substrate, wherein the chamber defines a heating zone; a first coil disposed at least partially around, or adjacent to, the heating zone; a second coil disposed at least partially around, or adjacent to, the heating zone. The first coil is a drive coil couplable to a source of alternating current. The second coil is a resonant coil of a resonant circuit, the second coil being inductively couplable to the first coil. In use, the first coil and second coil may form a resonant inductive coupling. Advantageously, inductive coupling of the first and second coil increases the current flow and thus the magnetic field strength that can be produced by the coils, to increase the overall efficiency of the device.

In another aspect the invention comprises an aerosol-generating device according to the invention and an aerosol-generating article comprising the aerosol-forming substrate, wherein the aerosol-generating article is configured for use with the aerosol-generating device.

According to another aspect of the present invention, there is provided an aerosol-generating device comprising: a housing having a chamber sized to receive at least a portion of an aerosol-generating article, wherein the chamber has a heating zone having a length extending in the longitudinal direction of the chamber; a first inductor coil disposed at least partially around the heating zone; a second inductor coil disposed at least partially around the heating zone, wherein the first and second inductor coils are both disposed along the entire length of the heating zone; and a power supply and a controller connected to the first and second inductor coils and configured to provide an alternating electric current to each of the first and second inductor coils independently of each other such that, in use, the first and second inductor coils each generate an alternating magnetic field to heat an elongate susceptor element located in the heating zone and thereby heat at least a portion of an aerosol-generating article received in the chamber.

According to a second aspect of the present invention, there is provided an aerosol-generating system comprising an aerosol-generating device according to any of the embodiments described herein, an aerosol-generating article having an aerosol-forming substrate which is configured for use with the aerosol-generating device, and an elongate susceptor element. The elongate susceptor element is inductively heatable by one or both of the first and second inductor coils to heat at least a portion of the aerosol-generating article when the aerosol-generating article is at least partially received in the chamber.

BRIEF DESCRIPTION OF THE DRAWINGS

The invention according to one or more of the aspects described above is further described, by way of example only, with reference to the accompanying drawings in which.

DETAILED DESCRIPTION

Figure 1:
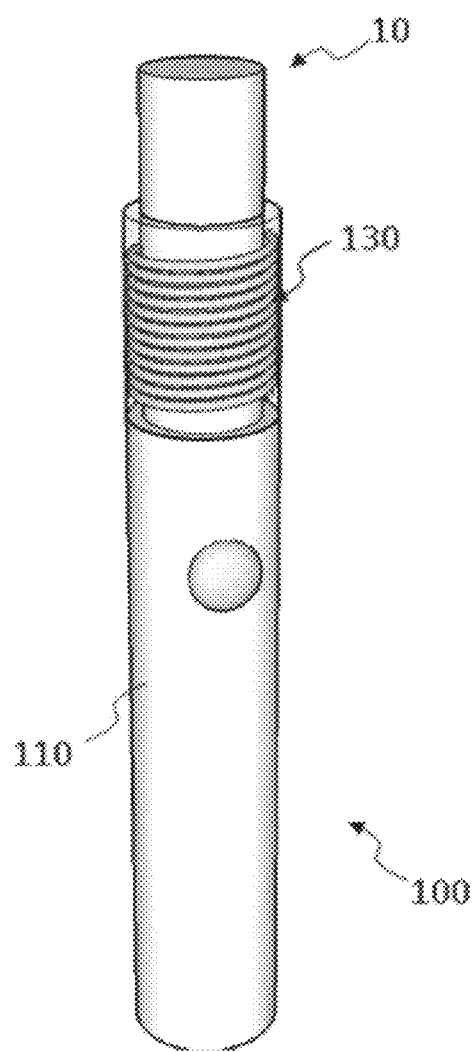
FIG. 1 is a perspective side view of an embodiment of an aerosol-generating system having an aerosol-generating device, in which inductor coil assembly and the susceptor element are also shown.

The resonant circuit of the aerosol-generating device may comprise the second coil and a capacitor. Advantageously, the second coil does not need to be connected to a power supply.

The aerosol-generating device may comprise a power supply and a controller electrically connected to the first coil and configured to provide the alternating current. Advantageously, this may allow the electrical current supplied to the first coil, and thus the magnetic field strength, to be controlled, The first coil of the aerosol-generating device may form part of a first circuit having a first resonant frequency, and the second coil forms part of the resonant circuit having a second resonant frequency. The first resonant frequency and the second resonant frequency are preferably the same. Advantageously, this provides for the optimal inductive coupling between the first and second coils.

The first coil and second coils of the aerosol-generating device may have a first magnetic axis and a second magnetic axis respectively. The first magnetic axis and the second magnetic axis may be substantially parallel. This may facilitate an increased heating effect in the heating zone.

The first and second coils may be helical or planar. Advantageously, this may facilitate optimal positioning of an elongate susceptor element for heating by either of the coils.

The first and second coils may be co-wound. Advantageously the co-wound coils may facilitate a more compact arrangement. It may also facilitate optimal positioning of an elongate susceptor element for heating by either of the coils.

The aerosol-generating device may advantageously comprise a DC/AC inverter for converting a DC current supplied by a DC power supply to the alternating current.

The aerosol-generating device may comprise a susceptor element projecting into the heating zone. The susceptor element may be inductively heatable by one or both of the first and second coils to heat at least a portion of an aerosol-forming substrate when the aerosol-forming substrate is at least partially received in the chamber. The susceptor element may be an elongate susceptor element arranged to penetrate the aerosol-forming substrate when the aerosol-forming substrate is received in the chamber.

As used herein, the term 'longitudinal' is used to describe the direction along the main axis of the aerosol-generating device, of the aerosol-generating article, or of a component of the aerosol-generating device or an aerosol-generating article, and the term 'transverse' is used to describe the direction perpendicular to the longitudinal direction. When referring to the chamber, the term 'longitudinal' refers to the direction in which an aerosol-generating article is inserted into the chamber and the term 'transverse' refers to a direction perpendicular to the direction in which an aerosol-generating article is inserted into the chamber.

Generally, the chamber will have an open end in which an aerosol-generating article is inserted, and a closed end opposite the open end. In such embodiments, the longitudinal direction is the direction extending between the open and closed ends. In certain embodiments, the longitudinal axis of the chamber is parallel with the longitudinal axis of the aerosol-generating device. For example, where the open end of the chamber is positioned at the proximal end of the aerosol-generating device. In other embodiments, the longitudinal axis of the chamber is at an angle to the longitudinal axis of the aerosol-generating device, for example transverse to the longitudinal axis of the aerosol-generating device. For example, where the open end of the chamber is positioned along one side of the aerosol-generating device such that an aerosol-generating article may be inserted into the chamber in direction which is perpendicular to the longitudinal axis of the aerosol-generating device.

As used herein, the term "proximal" refers to a user end, or mouth end of the aerosol-generating device, and the term "distal" refers to the end opposite to the proximal end. When referring to the chamber or the inductor coil, the term "proximal" refers to the region closest to the open end of the chamber and the term "distal" refers to the region closest to the closed end.

As used herein, the term "length" refers to the major dimension in a longitudinal direction of the aerosol-generating device, of an aerosol-generating article, or of a component of the aerosol-generating device or an aerosol-generating article.

As used herein, the term "width" refers to the major dimension in a transverse direction of the aerosol-generating device, of an aerosol-generating article, or of a component of the aerosol-generating device or an aerosol-generating article, at a particular location along its length. The term "thickness" refers to the dimension in a transverse direction perpendicular to the width.

As used herein, the term 'aerosol-forming substrate' relates to a substrate capable of releasing volatile compounds that can form an aerosol. Such volatile compounds may be released by heating the aerosol-forming substrate. An aerosol-forming substrate is part of an aerosol-generating article.

As used herein, the term 'aerosol-generating article' refers to an article comprising an aerosol-forming substrate that is capable of releasing volatile compounds that can form an aerosol. For example, an aerosol-generating article may be an article that generates an aerosol that is directly inhalable by the user drawing or puffing on a mouthpiece at a proximal or user-end of the system. An aerosol-generating article may be disposable. An article comprising an aerosol-forming substrate comprising tobacco is referred to as a tobacco stick.

As used herein, the term "aerosol-generating device" refers to a device that interacts with an aerosol-generating article to generate an aerosol.

As used herein, the term "aerosol-generating system" refers to the combination of an aerosol-generating article, as further described and illustrated herein, with an aerosol-generating device, as further described and illustrated herein. In the system, the aerosol-generating article and the aerosol-generating device cooperate to generate a respirable aerosol.

As used herein, a "susceptor element" means a conductive element that heats up when subjected to a changing magnetic field. This may be the result of eddy currents induced in the susceptor element, hysteresis losses, or both eddy currents and hysteresis losses. During use, the susceptor elements are located in thermal contact or close thermal proximity with the aerosol-forming substrate of an aerosol-generating article received in the chamber of the aerosol-generating device. In this manner, the aerosol-forming substrate is heated by the susceptor elements such that an aerosol is formed.

The term "heating zone" refers to a portion of the length of the chamber which is at least partially surrounded by both the lines first and second inductor coils so that a susceptor placed in the heating zone is inductively heatable by both of the first and second inductor coils.

The term "coil" as used herein is interchangeable with the terms "inductive coil" or "induction coil" or "inductor" throughout. A coil may be a driven (primary) coil connected to a power supply, or a resonant (secondary, load bearing) coil inductively couplable to a driven coil.

The following features may be applicable to any aspect of the invention.

The power supply and the controller are configured to provide an alternating electric current to each of the first and second inductor coils independently of each other. This means that the power supply and the controller are able to provide an alternating electric current to the first inductor coil on its own, to the second inductor coil on its own, or to both inductor coils simultaneously.

Advantageously, providing first and second inductor coils which are both disposed along the entire length of the heating zone and can be activated independently may facilitate a variable heating effect provided by the aerosol-generating device in the heating zone. A variable heating effect may enable the aerosol-generating device to change the heating profile during use, for example to provide different heating at different points during operation, such as at start-up and between uses, by activating the first and second inductor coils independently. For example, when the aerosol-generating device is initiated, the first and second inductor coils may be activated simultaneously. This may maximise the heating effect and minimise the start-up time required for a susceptor element within the chamber to reach a desired operating temperature. During normal operation, the current supplied to one of the coils may be reduced or stopped so that the remaining coil provides the majority of the heating effect. This may facilitate reduced power consumption and may facilitate efficient operation of the aerosol-generating device.

The heating effect may be varied by controlling the first and second inductor coils independently. The heating effect may be varied by providing the first and second coils with different configurations so that the magnetic field generated by each coil under the same applied current is different. For example, the heating effect may be varied by forming the first and second coils from different types of wire so that the magnetic field generated by each coil under the same applied current is different. The heating effect may be varied by controlling the first and second inductor coils independently and by providing the first and second coils with different configurations so that the magnetic field generated by each coil under the same applied current is different.

Using inductive heating has the advantage that the heating element, in this case a susceptor element, need not be electrically joined to any other components, eliminating the need for solder or other bonding elements for the heating element.

Advantageously, providing an inductor coil as part of the aerosol-generating device makes it possible to construct an aerosol-generating article that is simple, inexpensive and robust. Aerosol-generating articles are typically disposable and produced in much larger numbers that the aerosol-generating devices with which they operate. Accordingly, reducing the cost of the aerosol-generating articles, even if it requires a more expensive device, can lead to significant cost savings for both manufacturers and consumers.

In addition, the use of inductive heating rather than a resistive coil may provide improved energy conversion because of power losses associated with a resistive coil, in particular losses due to contact resistance at connections between the resistive coil and the power supply.

Advantageously, using an inductor coil rather than a resistive coil may extend the lifetime of the aerosol-generating device since the inductor coil itself undergoes minimal heating during use of the aerosol-generating device.

The first and second inductor coils are each disposed at least partially around the heating zone. One or both of the first and second inductor coils may extend only partially around the circumference of the chamber in the region of the heating zone. One or both of the first and second inductor coils may extend around the entire circumference of the chamber in the region of the heating zone.

Advantageously, the first and second inductor coils are arranged such that their magnetic axes are substantially parallel. This may facilitate an increased heating effect in the heating zone. As used, herein, the term "substantially parallel" means within plus or minus 10 degrees, preferably within plus or minus 5 degrees.

The longitudinal positions of the first and second inductor coils relative to the chamber overlap in the heating zone. The longitudinal positions of the first and second inductor coils relative to the chamber may be different. For example, one or both of the first and second inductor coils may extend beyond the heating zone in a longitudinal direction. In such embodiments, the opposite ends of the first and second inductor coils overlap around the heating zone while the remainder of the coils may be positioned beyond the heating zone in the longitudinal direction.

Advantageously, the longitudinal positions of the first and second inductor coils relative to the chamber are substantially the same. This means that the first and second inductor coils have substantially the same length and are disposed around the same portion of the chamber as each other. This may facilitate energy-efficient use of the aerosol-generating device by maximising the possible heating effect in the heating zone.

One or both of the inductor coils may be a planar coil disposed around part of the circumference of the chamber. Both inductor coils may be planar coils disposed around part of the circumference of the chamber. The planar coils may be disposed on opposite sides of the chamber to each other. As used herein a "planar coil" means a spirally wound coil having an axis of winding which is normal to the surface in which the coil lies. The planar coils may lie in a flat Euclidean plane. The planar coils may lie on a curved plane. For example, the planar coils may be wound in a flat Euclidian plane and subsequently bent to lie on a curved plane.

Advantageously, the first and second inductor coils are helical. The first and second inductor coils may be helical and wound around a central void in which the chamber is positioned. The first and second inductor coils may be disposed around the entire circumference of the chamber.

The first and second inductor coils may be helical and concentric. The first and second inductor coils may have different diameters. The first and second inductor coils may be helical and concentric and may have different diameters.

In such embodiments, the smaller of the two coils may be positioned at least partially within the larger of the first and second inductor coils.

Advantageously, the first and second inductor coils are co-wound. Providing co-wound first and second inductor coils may facilitate a more compact arrangement. It may also facilitate optimal positioning of the elongate susceptor element for heating by either of the coils.

The first and second inductor coils may be co-wound along at least part of their respective lengths. The first and second inductor coils may be co-wound to form a single combined coil. The windings of the first and second inductor coils may alternate along the length of the combined coil.

The windings of the first coil are electrically insulated from the windings of the second coil.

The aerosol-generating device may further comprise one or more additional inductor coils which are co-wound with the first and second inductor coils. For example, the aerosol-generating device may further comprise third and fourth inductor coils which are co-wound with the first and second inductor coils. In such embodiments, the windings of the first to fourth inductor coils may alternate along the length of the combined coil.

Advantageously, the first and second inductor coils have different inductance values. The first inductor coil may have a first inductance and the second inductor coil may have a second inductance which is less than the first inductance. This means that the magnetic fields generated by the first and second inductor coils will have different strengths for a given current. This may facilitate a different heating effect by the first and second coils while applying the same amplitude of current to both coils. This may reduce the control requirements of the aerosol-generating device. Where the first and second inductor coils are activated independently, the inductor coil with the greater inductance may be activated at a different time to the inductor coil with the lower inductance. For example, the inductor coil with the greater inductance may be activated during operation, such as during puffing, and the inductor coil with the lower inductance may be activated between operations, such as between puffs. Advantageously, this may facilitate the maintenance of an elevated temperature within the chamber between uses without requiring the same power as normal use. This 'pre-heat' may reduce the time taken for the chamber to return to the desired operating temperature once operation of the aerosol-generating device use is resumed.

The first inductance may be greater than the second inductance. This means that the first inductor coil will generate an alternating magnetic field which is stronger than the alternating magnetic field generated by the second inductor coil for a given current. Alternatively, first inductance may be lower than the second inductance.

The first inductance may be from about 110 percent to about 200 percent of the second inductance, preferably from about 150 percent to about 200 percent.

The first and second inductor coils may be formed from the same type of wire.

Advantageously, the first inductor coil is formed from a first type of wire and the second inductor coil is formed from a second type of wire which is different to the first type of wire. For example, the wire compositions or cross-sections may differ. In this manner, the inductance of the first and second inductor coils may be different even if the overall coil geometries are the same. This may allow the same or similar coil geometries to be used for the first and second inductor coils. This may facilitate a more compact arrangement.

The first type of wire may comprise a first wire material and the second type of wire may comprise a second wire material which is different from the first wire material. The electrical properties of the first and second wire materials may differ. For example, first type of wire may have a first resistivity and the second type of wire may have a second resistivity which is different to the first resistivity.

Suitable materials for the first and second inductor coils include copper, aluminium, silver and steel. Preferably, the first and second inductor coils are formed from copper or aluminium.

Where the first inductor coil is formed from a first type of wire and the second inductor coil is formed from a second type of wire which is different to the first type of wire, the first type of wire may have a different cross-section to the second type of wire. The first type of wire may have a first cross-section and the second type of wire may have a second cross-section which is different to the first cross-section. For example, the first type of wire may have a first cross-sectional shape and the second type of wire may have a second cross-sectional shape which is different to the first cross-sectional shape. The first type of wire may have a first thickness and the second type of wire may have a second thickness which is different to the first thickness. The cross-sectional shape and the thickness of the first and second types of wire may be different.

The power supply and the controller may be configured to vary independently the amplitude of the alternating electric current supplied to each of the first inductor coil and the second inductor coil. With this arrangement, the strength of the magnetic fields generated by the first and second inductor coils may be varied independently by varying the amplitude of the current supplied to each coil. This may facilitate a conveniently variable heating effect. For example, the amplitude of the current provided to one or both of the coils may be increased during start-up to reduce the initiation time of the aerosol-generating device.

Advantageously, the aerosol-generating device further comprises an elongate susceptor element attached to the housing and projecting into the heating zone.

As used herein, the term 'elongate' refers to a component having a length which is greater than both its width and thickness, for example twice as great.

The elongate susceptor element may be fixedly attached to the housing of the aerosol-generating device. In such embodiments, the susceptor element may not be readily removed from the aerosol-generating device housing, for example without damaging the susceptor element or the housing.

Advantageously, the elongate susceptor element may be removably attached to the housing. For example, the elongate susceptor element may be removably attached to the housing within the chamber. The part of the aerosol-generating device that is heated and may therefore exhibit a shorter lifetime is the susceptor element. Thus, providing a removable elongate susceptor element allows the elongate susceptor element to be replaced easily and may extend the lifetime of the aerosol-generating device. Advantageously, providing a removable elongate susceptor element also facilitates cleaning of the susceptor element, replacement of the susceptor element, or both. It may also facilitate cleaning of the chamber. It may allow the susceptor element to be selectively replaced by a user according to the aerosol-generating article with which the susceptor element will be used. For example, certain susceptor elements may be particularly suited, or tuned, for use with a particular type of aerosol-generating article, or with an aerosol-generating article having a particular arrangement or type of aerosol-forming substrate. This may allow the performance of the aerosol-generating device with which the susceptor element is used to be optimised based on the type of aerosol-generating article.

The elongate susceptor element may be removably attached to the aerosol-generating device by any suitable mechanism. For example, by a threaded connection, by frictional engagement, or by a mechanical connection such as a bayonet, a clip, or equivalent, mechanism.

In any of the embodiments described herein, at least a portion of the elongate susceptor element may extend in the longitudinal direction of the chamber. That is, preferably at least a portion of the elongate susceptor element extends substantially parallel with the longitudinal axis of the chamber. As used, herein, the term "substantially parallel" means within plus or minus 10 degrees, preferably within plus or minus 5 degrees. Advantageously, this facilitates insertion of at least a portion of the elongate susceptor element into an aerosol-generating article when the aerosol-generating article is inserted into the chamber.

The magnetic axis of one or both of the inductor coils may be at an angle to, that is, non-parallel with, the longitudinal axis of the chamber. In preferred embodiments, the magnetic axis of the first and second inductor coils are substantially parallel with the longitudinal axis of the chamber. This may facilitate a more compact arrangement. Preferably, at least a portion of the elongate susceptor element is substantially parallel with the magnetic axis of one or both inductor coils. The may facilitate even heating of the elongate susceptor element by the inductor coils. In particularly preferred embodiments, the elongate susceptor element is substantially parallel with the magnetic axes of the inductor coils and with the longitudinal axis of the chamber.

The elongate susceptor element may be positioned centrally within the chamber. The elongate susceptor element may extend along the longitudinal axis of the chamber.

Preferably, the elongate susceptor element comprises a free end projecting into the chamber. Preferably, the free end is configured for insertion into an aerosol-generating article when the aerosol-generating article is inserted into the chamber. Preferably, the free end is tapered. That is, the cross-sectional area of a portion of the elongate susceptor element decreases in a direction towards the free end. Advantageously, a tapered free end facilitates insertion of the elongate susceptor element into an aerosol-generating article. Advantageously, a tapered free end may reduce the amount of aerosol-forming substrate displaced by the elongate susceptor element during insertion of an aerosol-generating article into the chamber. This may reduce the amount of cleaning required.

The elongate susceptor element may extend along only part of the length of the chamber. The elongate susceptor element may extend along substantially the entire length of the chamber. The elongate susceptor element may extend beyond the chamber to protrude from the housing. Where the elongate susceptor element is removable, providing an elongate susceptor element which extends beyond the chamber to protrude from the housing may allow for easier grasping by a user for removal of the susceptor element.

The elongate susceptor element may be formed from any material that can be inductively heated to a temperature sufficient to aerosolise an aerosol-forming substrate. Suitable materials for the elongate susceptor element include graphite, molybdenum, silicon carbide, stainless steels, niobium, aluminium, nickel, nickel containing compounds, titanium, and composites of metallic materials. Preferred elongate susceptor elements comprise a metal or carbon. Advantageously the elongate susceptor element comprises or consists of a ferromagnetic material, for example, ferritic iron, a ferromagnetic alloy, such as ferromagnetic steel or stainless steel, ferromagnetic particles, and ferrite. A suitable elongate susceptor element may be, or comprise, aluminium. The elongate susceptor element preferably comprises more than 5 percent, preferably more than 20 percent, more preferably more than 50 percent or more than 90 percent of ferromagnetic or paramagnetic materials. Preferred elongate susceptor elements may be heated to a temperature in excess of 250 degrees Celsius.

The elongate susceptor element may be formed from a single material layer. The single material layer may be a steel layer.

The elongate susceptor element may comprise a non-metallic core with a metal layer disposed on the non-metallic core. For example, the elongate susceptor element may comprise metallic tracks formed on an outer surface of a ceramic core or substrate.

The susceptor element may be formed from a layer of austenitic steel. One or more layers of stainless steel may be arranged on the layer of austenitic steel. For example, the susceptor element may be formed from a layer of austenitic steel having a layer of stainless steel on each of its upper and lower surfaces.

The elongate susceptor element may comprise a first susceptor material and a second susceptor material. The first susceptor material may be disposed in intimate physical contact with the second susceptor material. The first and second susceptor materials may be in intimate contact to form a unitary susceptor. In certain embodiments, the first susceptor material is stainless steel and the second susceptor material is nickel. The susceptor element may have a two layer construction. The susceptor elements may be formed from a stainless steel layer and a nickel layer.

Intimate contact between the first susceptor material and the second susceptor material may be made by any suitable means. For example, the second susceptor material may be plated, deposited, coated, clad or welded onto the first susceptor material. Preferred methods include electroplating, galvanic plating and cladding.

The second susceptor material may have a Curie temperature that is lower than 500° C. The first susceptor material may be primarily used to heat the susceptor when the susceptor is placed in an alternating electromagnetic field. Any suitable material may be used. For example the first susceptor material may be aluminium, or may be a ferrous material such as a stainless steel. The second susceptor material is preferably used primarily to indicate when the susceptor has reached a specific temperature, that temperature being the Curie temperature of the second susceptor material. The Curie temperature of the second susceptor material can be used to regulate the temperature of the entire susceptor during operation. Thus, the Curie temperature of the second susceptor material should be below the ignition point of the aerosol-forming substrate. Suitable materials for the second susceptor material may include nickel and certain nickel alloys. The Curie temperature of the second susceptor material may preferably be selected to be lower than 400° C., preferably lower than 380° C., or lower than 360° C. It is preferable that the second susceptor material is a magnetic material selected to have a Curie temperature that is substantially the same as a desired maximum heating temperature. That is, it is preferable that the Curie temperature of the second susceptor material is approximately the same as the temperature that the susceptor should be heated to in order to generate an aerosol from the aerosol-forming substrate. The Curie temperature of the second susceptor material may, for example, be within the range of 200° C. to 400° C., or between 250° C. and 360° C. In some embodiments it may be preferred that the first susceptor material is in the form of an elongate strip having a width of between 3 mm and 6 mm and a thickness of between 10 micrometres and 200 micrometres, and that the second susceptor material is in the form of discrete patches that are plated, deposited, or welded onto the first susceptor material. For example, the first susceptor material may be an elongate strip of grade 430 stainless steel or an elongate strip of aluminium and the second elongate material may be in the form of patches of nickel having a thickness of between 5 micrometres and 30 micrometres deposited at intervals along the elongate strip of the first susceptor material. Patches of the second susceptor material may have a width of between 0.5 mm and the thickness of the elongate strip. For example the width may be between 1 mm and 4 mm, or between 2 mm and 3 mm. Patches of the second susceptor material may have a length between 0.5 mm and about 10 mm, preferably between 1 mm and 4 mm, or between 2 mm and 3 mm.

In some embodiments it may be preferred that the first susceptor material and the second susceptor material are co-laminated in the form of an elongate strip having a width of between 3 mm and 6 mm and a thickness of between 10 micrometres and 200 micrometres. Preferably, the first susceptor material has a greater thickness than the second susceptor material. The co-lamination may be formed by any suitable means. For example, a strip of the first susceptor material may be welded or diffusion bonded to a strip of the second susceptor material. Alternatively, a layer of the second susceptor material may be deposited or plated onto a strip of the first susceptor material.

In some embodiments it may be preferred that each elongate susceptor has a width of between 3 mm and 6 mm and a thickness of between 10 micrometres and 200 micrometres, the susceptor comprising a core of the first susceptor material encapsulated by the second susceptor material. Thus, the susceptor may comprise a strip of the first susceptor material that has been coated or clad by the second susceptor material. As an example, the susceptor may comprise a strip of 430 grade stainless steel having a length of 12 mm, a width of 4 mm and a thickness of between 10 micrometres and 50 micrometres, for example 25 micrometres. The grade 430 stainless steel may be coated with a layer of nickel of between 5 micrometres and 15 micrometres, for example 10 micrometres.

The elongate susceptor element may comprise a first susceptor material, a second susceptor material and a protective layer. The first susceptor material may be disposed in intimate physical contact with the second susceptor material. The protective layer may be disposed in intimate physical contact with one or both of the first susceptor material the second susceptor material. The first and second susceptor materials and the protective layer may be in intimate contact to form a unitary susceptor. The protective layer may be a layer of austenitic steel. In certain embodiments, one or more of the elongate susceptor elements comprises a layer of steel, a layer of nickel, and a protective layer of austenitic steel. The protective layer of austenitic steel may be applied to the nickel layer. This may help to protect the nickel layer from detrimental environmental effects, such as oxidation, corrosion, and diffusion.

The elongate susceptor element may have any suitable cross-section. For example, the elongate susceptor element may have a square, oval, rectangular, triangular, pentagonal, hexagonal, or similar cross-sectional shape. The elongate susceptor element may have a planar or flat cross-sectional area.

The elongate susceptor element may be solid, hollow, or porous. Preferably, the elongate susceptor element is solid. The susceptor element is preferably in the form of a pin, rod, blade, or plate. The susceptor element preferably has a length of between 5 millimetres and 15 millimetres, for example between 6 millimetres and 12 millimetres, or between 8 millimetres and 10 millimetres. Each susceptor element preferably has a width of between 1 millimetres and 8 millimetres, more preferably from about 3 millimetres to about 5 millimetres. The susceptor element may have a thickness of from about 0.01 millimetres to about 2 millimetres. If a susceptor element has a constant cross-section, for example a circular cross-section, it has a preferable width or diameter of between 1 millimetres and 5 millimetres.

Preferably, the aerosol-generating device is portable. The aerosol-generating device may have a size comparable to a conventional cigar or cigarette. The aerosol-generating device may have a total length between approximately 30 millimetres and approximately 150 millimetres. The aerosol-generating device may have an external diameter between approximately 5 millimetres and approximately 30 millimetres.

The housing may be elongate. The housing may comprise any suitable material or combination of materials. Examples of suitable materials include metals, alloys, plastics or composite materials containing one or more of those materials, or thermoplastics that are suitable for food or pharmaceutical applications, for example polypropylene, polyetheretherketone (PEEK) and polyethylene. Preferably, the material is light and non-brittle.

The housing may comprise a mouthpiece. The mouthpiece may comprise at least one air inlet and at least one air outlet. The mouthpiece may comprise more than one air inlet. One or more of the air inlets may reduce the temperature of the aerosol before it is delivered to a user and may reduce the concentration of the aerosol before it is delivered to a user.

Alternatively, the mouthpiece may be provided as part of an aerosol-generating article.

As used herein, the term "mouthpiece" refers to a portion of an aerosol-generating device that is placed into a user's mouth in order to directly inhale an aerosol generated by the aerosol-generating device from an aerosol-generating article received in the chamber of the housing.

The aerosol-generating device may include a user interface to activate the aerosol-generating device, for example a button to initiate heating of the aerosol-generating device or display to indicate a state of the aerosol-generating device or of the aerosol-forming substrate.

The aerosol-generating device comprises a power supply. The power supply may be a battery, such as a rechargeable lithium ion battery. Alternatively, the power supply may be another form of charge storage device such as a capacitor. The power supply may require recharging. The power supply may have a capacity that allows for the storage of enough energy for one or more uses of the aerosol-generating device. For example, the power supply may have sufficient capacity to allow for the continuous generation of aerosol for a period of around six minutes, corresponding to the typical time taken to smoke a conventional cigarette, or for a period that is a multiple of six minutes. In another example, the power supply may have sufficient capacity to allow for a predetermined number of puffs or discrete activations.

The power supply may be a DC power supply. In one embodiment, the power supply is a DC power supply having a DC supply voltage in the range of about 2.5 Volts to about 4.5 Volts and a DC supply current in the range of about 1 Amp to about 10 Amps (corresponding to a DC power supply in the range of about 2.5 Watts to about 45 Watts).

The power supply may be configured to operate at high frequency. As used herein, the term "high frequency oscillating current" means an oscillating current having a frequency of between 500 kilohertz and 30 megahertz. The high frequency oscillating current may have a frequency of from about 1 megahertz to about 30 megahertz, preferably from about 1 megahertz to about 10 megahertz and more preferably from about 5 megahertz to about 8 megahertz.

The aerosol-generating device comprises a controller connected to the inductor coils and the power supply. The controller is configured to control the supply of power to the inductor coils from the power supply. The controller may comprise a microprocessor, which may be a programmable microprocessor, a microcontroller, or an application specific integrated chip (ASIC) or other electronic circuitry capable of providing control. The controller may comprise further electronic components. The controller may be configured to regulate a supply of current to the inductor coils. Current may be supplied to one or both of the inductor coils continuously following activation of the aerosol-generating device or may be supplied intermittently, such as on a puff by puff basis. The electric circuitry may advantageously comprise DC/AC inverter, which may comprise a Class-D or Class-E power amplifier.

The elongate susceptor element may be provided as part of the aerosol-generating device. The elongate susceptor element may be attached to the housing of the aerosol-generating device such that it projects into the heating zone in the chamber. The elongate susceptor element may be substantially as described above in relation to the first aspect.

The elongate susceptor element may be provided as part of the aerosol-generating article. Advantageously, the chamber of the aerosol-generation device may be substantially empty when no aerosol-generating article is received in the chamber. This may facilitate cleaning of the chamber. The elongate susceptor element may be in thermal proximity to the aerosol forming substrate. The elongate susceptor element may be embedded in the aerosol-forming substrate. Form, kind, distribution and arrangement of the elongate susceptor element may be selected according to a user's need. The elongate susceptor element may be arranged substantially longitudinally within the aerosol-generating article. This means that the length dimension of the elongate susceptor element may be arranged to be approximately parallel to the longitudinal direction of aerosol-generating article, for example within plus or minus 10 degrees of parallel to the longitudinal direction of the aerosol-generating article.

Where the elongate susceptor element is provided as part of the aerosol-generating article, the elongate susceptor element is preferably in the form of a pin, rod, blade, or plate. The elongate susceptor element preferably has a length of between 5 millimetres and 15 millimetres, for example between 6 millimetres and 12 millimetres, or between 8 millimetres and 10 millimetres. The susceptor element preferably has a width of between 1 millimetres and 8, for preferably from about 3 millimetres to about 5 millimetres. The elongate susceptor element may have a thickness of between 0.01 millimetres and 2 millimetres, for example between 0.5 millimetres and 2 millimetres. If the elongate susceptor element has a constant cross-section, for example a circular cross-section, it has a preferable width or diameter of between 1 millimetre and 5 millimetres.

The elongate susceptor element may be formed from any material that can be inductively heated to a temperature sufficient to generate an aerosol from the aerosol-forming substrate. Suitable materials and structures are as discussed above in respect of the elongate susceptor element of the aerosol-generating device of the first aspect of the invention.

The system may be an electrically operated smoking system. The system may be a handheld aerosol-generating system. The aerosol-generating system may have a size comparable to a conventional cigar or cigarette. The smoking system may have a total length between approximately 30 mm and approximately 150 mm. The smoking system may have an external diameter between approximately 5 mm and approximately 30 mm.

The aerosol-generating system is a combination of an aerosol-generating device and one or more aerosol-generating articles for use with the aerosol-generating device. However, aerosol-generating system may include additional components, such as, for example a charging unit for recharging an on-board electric power supply in an electrically operated or electric aerosol-generating device.

The aerosol-forming substrate may comprise nicotine. The nicotine-containing aerosol-forming substrate may be a nicotine salt matrix. The aerosol-forming substrate may comprise plant-based material. The aerosol-forming substrate may comprise tobacco. The aerosol-forming substrate may comprise a tobacco-containing material including volatile tobacco flavour compounds which are released from the aerosol-forming substrate upon heating. Alternatively, the aerosol-forming substrate may comprise a non-tobacco material. The aerosol-forming substrate may comprise homogenised plant-based material. The aerosol-forming substrate may comprise homogenised tobacco material. Homogenised tobacco material may be formed by agglomerating particulate tobacco. In a particularly preferred embodiment, the aerosol-forming substrate comprises a gathered crimped sheet of homogenised tobacco material. As used herein, the term 'crimped sheet' denotes a sheet having a plurality of substantially parallel ridges or corrugations.

The aerosol-forming substrate may comprise at least one aerosol-former. An aerosol-former is any suitable known compound or mixture of compounds that, in use, facilitates formation of a dense and stable aerosol and that is substantially resistant to thermal degradation at the temperature of operation of the system. Suitable aerosol-formers are well known in the art and include, but are not limited to: polyhydric alcohols, such as triethylene glycol, 1,3-butanediol and glycerine; esters of polyhydric alcohols, such as glycerol mono-, di- or triacetate; and aliphatic esters of mono-, di- or polycarboxylic acids, such as dimethyl dodecanedioate and dimethyl tetradecanedioate. Preferred aerosol formers are polyhydric alcohols or mixtures thereof, such as triethylene glycol, 1,3-butanediol. Preferably, the aerosol former is glycerine. Where present, the homogenised tobacco material may have an aerosol-former content of equal to or greater than 5 percent by weight on a dry weight basis, and preferably from about 5 percent to about 30 percent by weight on a dry weight basis. The aerosol-forming substrate may comprise other additives and ingredients, such as flavourants.

In any of the above embodiments, the aerosol-generating article and the chamber of the aerosol-generating device may be arranged such that the aerosol-generating article is partially received within the chamber of the aerosol-generating device. The chamber of the aerosol-generating device and the aerosol-generating article may be arranged such that the aerosol-generating article is entirely received within the chamber of the aerosol-generating device.

The aerosol-generating article may be substantially cylindrical in shape. The aerosol-generating article may be substantially elongate. The aerosol-generating article may have a length and a circumference substantially perpendicular to the length. The aerosol-forming substrate may be provided as an aerosol-forming segment containing an aerosol-forming substrate. The aerosol-forming segment may be substantially cylindrical in shape. The aerosol-forming segment may be substantially elongate. The aerosol-forming segment may also have a length and a circumference substantially perpendicular to the length.

The aerosol-generating article may have a total length between approximately 30 millimetres and approximately 100 millimetres. In one embodiment, the aerosol-generating article has a total length of approximately 45 millimetres. The aerosol-generating article may have an external diameter between approximately 5 millimetres and approximately 12 millimetres. In one embodiment, the aerosol-generating article may have an external diameter of approximately 7.2 millimetres.

The aerosol-forming substrate may be provided as an aerosol-forming segment having a length of between about 7 millimetres and about 15 millimetres. In one embodiment, the aerosol-forming segment may have a length of approximately 10 mm. Alternatively, the aerosol-forming segment may have a length of approximately 12 millimetres.

The aerosol-generating segment preferably has an external diameter that is approximately equal to the external diameter of the aerosol-generating article. The external diameter of the aerosol-forming segment may be between approximately 5 millimetres and approximately 12 millimetres. In one embodiment, the aerosol-forming segment may have an external diameter of approximately 7.2 millimetres.

The aerosol-generating article may comprise a filter plug. The filter plug may be located at a downstream end of the aerosol-generating article. The filter plug may be a cellulose acetate filter plug. The filter plug is approximately 7 millimetres in length in one embodiment, but may have a length of between approximately 5 millimetres to approximately 10 millimetres.

The aerosol-generating article may comprise an outer paper wrapper. Further, the aerosol-generating article may comprise a separation between the aerosol-forming substrate and the filter plug. The separation may be approximately 18 millimetres, but may be in the range of approximately 5 millimetres to approximately 25 millimetres.

Features described in relation to one or more aspects may equally be applied to other aspects of the invention. In particular, features described in relation to the aerosol-generating device of the first aspect described above may be equally applied to the susceptor assembly of the second aspect described above, and to the aerosol-generating systems of the third and fourth aspects described above, and vice versa.

Specific embodiments and preferential features may be described as follows:

An aerosol-generating device comprising a housing having a chamber sized to receive at least a portion of an aerosol-generating article, wherein the chamber has a heating zone having a length extending in the longitudinal direction of the chamber;

a first inductor coil disposed at least partially around the heating zone;

a second inductor coil disposed at least partially around the heating zone, wherein the first and second inductor coils are both disposed along the entire length of the heating zone; and a power supply and a controller connected to the first and second inductor coils and configured to provide an alternating electric current to each of the first and second inductor coils independently of each other such that, in use, the first and second inductor coils each generate an alternating magnetic field to heat an elongate susceptor element located in the heating zone and thereby heat at least a portion of an aerosol-generating article received in the chamber.

An aerosol-generating device according to the invention, wherein the first and second inductor coils are arranged such that their magnetic axes are substantially parallel.

An aerosol-generating device according to the invention, wherein the longitudinal positions of the first and second inductor coils relative to the chamber are substantially the same.

An aerosol-generating device according the invention, wherein the first and second inductor coils are helical.

An aerosol-generating device according to the invention, wherein the first and second inductor coils are co-wound.

An aerosol-generating device according to the invention, wherein the first inductor coil has a first inductance and the second inductor coil has a second inductance which is less than the first inductance.

An aerosol-generating device according to the invention, wherein the first inductor coil is formed from a first type of wire and the second inductor coil is formed from a second type of wire which is different to the first type of wire.

An aerosol-generating device according to the invention, wherein the first type of wire comprises a first wire material and the second type of wire comprises a second wire material which is different from the first wire material.

An aerosol-generating device according to the invention, wherein the first type of wire has a first cross-section and the second type of wire has a second cross-section which is different to the first cross-section.

An aerosol-generating device according to the invention, wherein the power supply and the controller may be configured to vary independently the amplitude of the alternating electric current supplied to each of the first inductor coil and the second inductor coil.

An aerosol-generating device according to the invention further comprising an elongate susceptor element attached to the housing and projecting into the heating zone.

An aerosol-generating system comprising an aerosol-generating device according to the invention, an aerosol-generating article having an aerosol-forming substrate which is configured for use with the aerosol-generating device, and an elongate susceptor element which is inductively heatable by one or both of the first and second inductor coils to heat at least a portion of the aerosol-generating article when the aerosol-generating article is at least partially received in the chamber.

An aerosol-generating system according to the invention, wherein the elongate susceptor element is provided as part of the aerosol-generating article.

Figure 2:
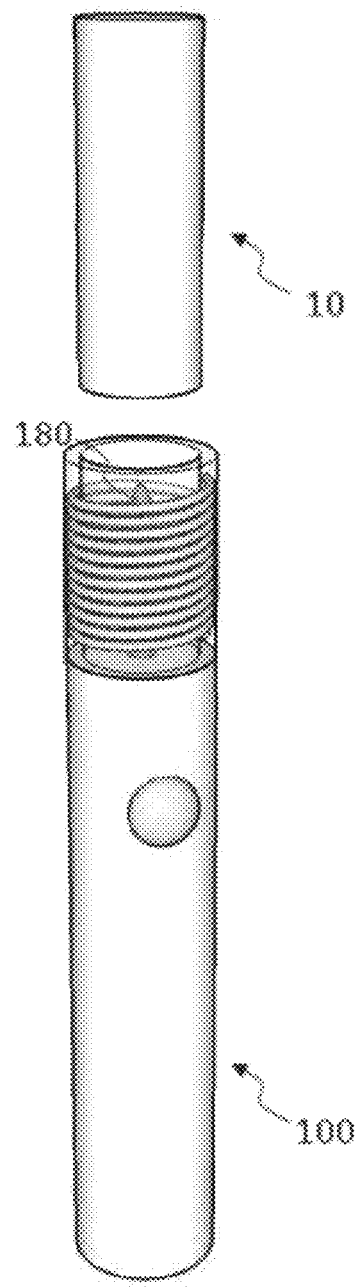
FIG. 2 is a perspective side view of the aerosol-generating system of FIG. 1 in which the aerosol-generating article is removed from the chamber.
Figure 3:
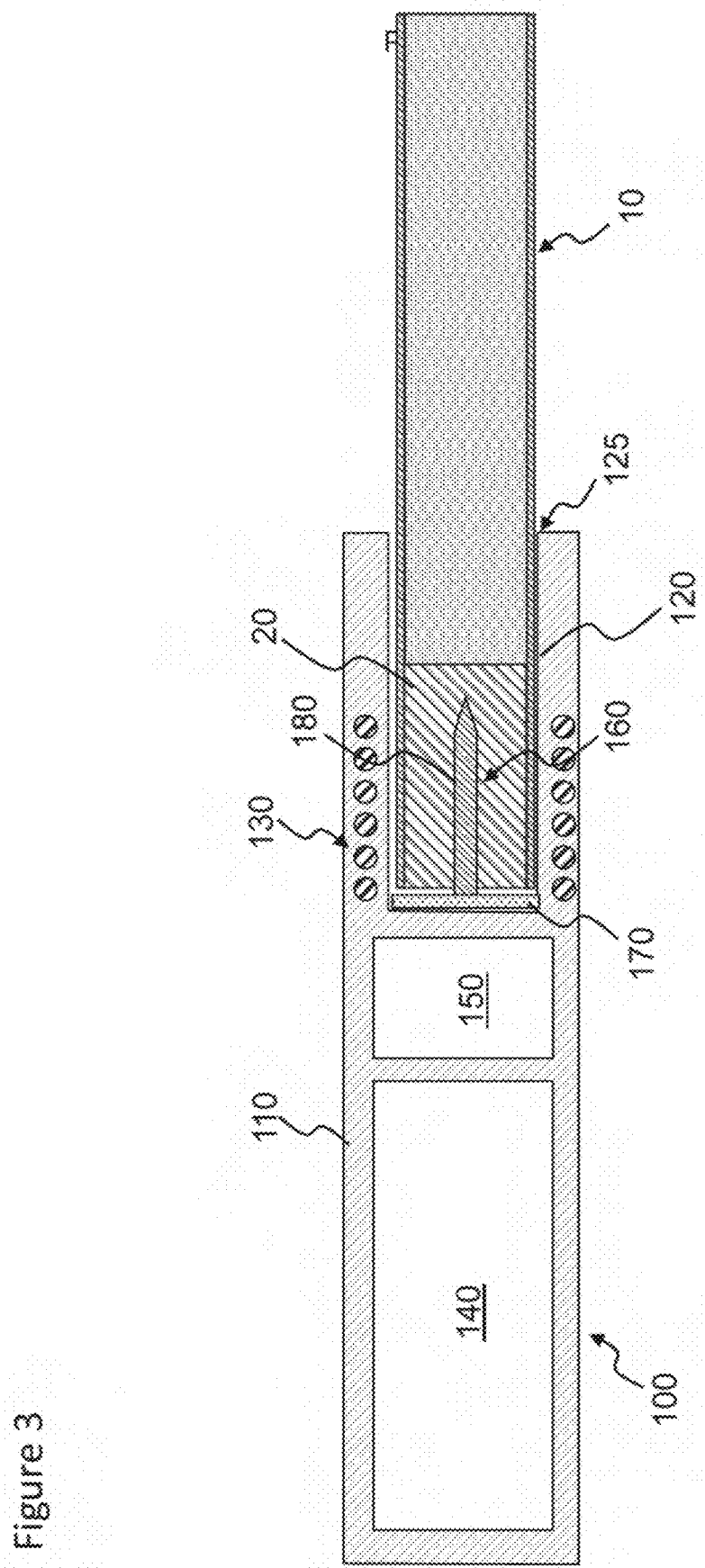
FIG. 3 is a schematic cross-sectional illustration of the system of FIG. 1.

FIG. 1 to FIG. 3 show different views of an aerosol-generating system according to a first embodiment of the invention. The aerosol-generating system comprises an aerosol-generating device 100 according to a first embodiment and an aerosol-generating article 10 configured for use with the aerosol-generating device 10.

The aerosol generating device 100 comprises a device housing 110 defining a chamber 120 for receiving the aerosol-generating article 10. The proximal end of the housing 110 has an insertion opening 125 through which the aerosol-generating article 10 may be inserted into and removed from the chamber 120. An inductor coil assembly 130 is arranged inside the aerosol-generating device 100 between an outer wall of the housing 110 and the chamber 120. The inductor coil assembly 130 has a magnetic axis corresponding to the longitudinal axis of the chamber 120, which, in this embodiment, corresponds to the longitudinal axis of the aerosol-generating device 100. As shown in FIG. 1, the inductor coil assembly 130 extends along part of the length of the chamber 120. In other embodiments, the inductor coil assembly 130 may extend along all, or substantially all, of the length of the chamber 120.

The aerosol-generating device 100 also includes an internal electric power supply 140, for example a rechargeable battery, and a controller 150, for example a printed circuit board with circuitry, both located in a distal region of the housing 110. The controller 150 and the inductor coil assembly 130 both receive power from the power supply 140 via electrical connections (not shown) extending through the housing 110. Preferably, the chamber 120 is isolated from the inductor coil assembly 130 and the distal region of the housing 110, which contains the power source 140 and the controller 150, by a fluid-tight separation. Thus, electric components within the aerosol-generating device 100 may be kept separate from aerosol or residues produced within the chamber 120 by the aerosol generating process. This may also facilitate cleaning of the aerosol-generating device 100, since the chamber 120 may be made completely empty simply by removing the aerosol-generating article. This arrangement may also reduce the risk of damage to the aerosol-generating device, either during insertion of an aerosol-generating article or during cleaning, since no potentially fragile elements are exposed within the chamber 120. Ventilation holes (not shown) may be provided in the walls of the housing 110 to allow airflow into the chamber 120. Alternatively, or in addition, airflow may enter the chamber 120 at the opening 125 and flow along the length of the chamber 120 between the outer walls of the aerosol-generating article 10 and the inner walls of the chamber 120.

The aerosol-generating device 100 also includes a susceptor assembly 160 located within the chamber 120. The susceptor assembly 160 includes a base portion 170 and an elongate susceptor element 180 attached to the base portion 170 and projecting into the chamber 120. The elongate susceptor element 180 is parallel with the longitudinal axis of the chamber 120 and with the magnetic axis of the inductor coil assembly 130. The elongate susceptor element 180 is positioned within the portion of the chamber 120 which is surrounded by the inductor coil assembly 130 so that it is inductively heatable by the inductor coil assembly 130. The portion of the chamber 120 which is surrounded by the inductor coil assembly is referred to herein as the heating zone. In this example, the elongate susceptor element 180 is positioned centrally within the chamber 120. That is, the elongate susceptor element 180 is substantially aligned with the longitudinal axis of the chamber 120. The susceptor element 180 is tapered towards its free end to form a sharp tip. This may facilitate insertion of the susceptor element 180 into an aerosol-generating article received in the cavity. In this example, the base portion 170 is fixed within the chamber 120 and the susceptor element 180 is fixed to the base portion 170. In other examples, the base portion 170 may be removably coupled to the housing 110 to allow the susceptor assembly 160 to be removed from the chamber 120 as a single component. For example, the base portion 170 may be removably coupled to the housing 110 using a releasable clip (not shown), a threaded connection, or similar mechanical coupling.

The aerosol-forming article 10 includes an aerosol-forming segment 20 at its distal end. The aerosol-forming segment 20 contains an aerosol-forming substrate, for example a plug comprising tobacco material and an aerosol former, which is heatable to generate an aerosol.

Figure 4:
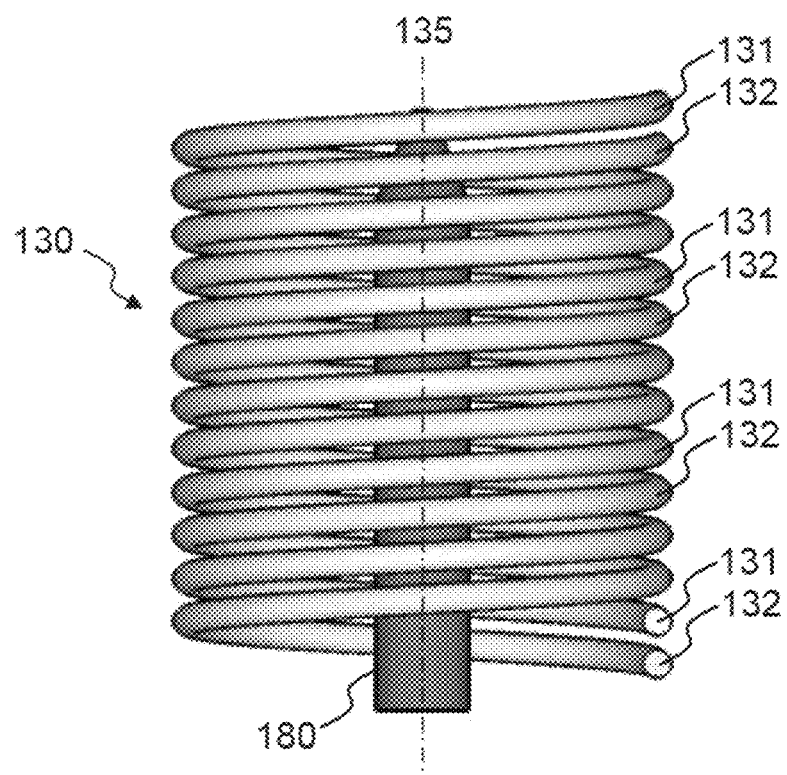
FIG. 4 is a side view of the inductor coil assembly and susceptor element of the aerosol-generating system of FIG. 1, with all other components omitted for clarity.
Figure 5:
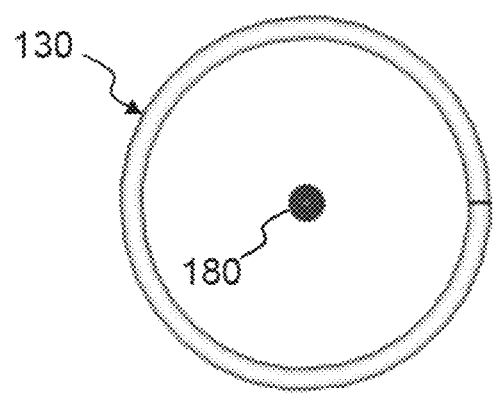
FIG. 5 is an end view of the inductor coil assembly and susceptor element of FIG. 4.

FIG. 4 and FIG. 5 show the inductor assembly and the elongate susceptor element in more detail. The inductor coil assembly 130 comprises a first inductor coil 131 and a second inductor coil 132 which are co-wound to form the inductor coil assembly 130. The first and second inductor coils 131, 132 are each formed from a wire having a plurality of turns, or windings, extending along its length. The windings of the first inductor coil 131 alternate with the windings of the second inductor coil 132 along the length of the inductor coil assembly 130, or 'combined coil'. By co-winding the first and second inductor coils 131, 132, the longitudinal axes and magnetic axes of both coils are substantially the same. This is represented in FIG. 4 by the magnetic axis 135 of the inductor coil assembly 130. In each inductor coil, the wire may have any suitable cross-sectional shape, such as square, oval, or triangular. In this embodiment, each wire has a circular cross-section. In other embodiments, one or both wires may have a flat cross-sectional shape. For example, the first or second inductor coil may be formed from a wire having a rectangular cross-sectional shape and wound such that the maximum width of the cross-section of the wire extends parallel to the magnetic axis of the inductor coil assembly. Such flat inductor coils may allow the outer diameter of the inductor, and therefore the outer diameter of the aerosol-generating device, to be minimized.

In one configuration, the first and second inductor coils 131, 132 may both receive power from the power supply 140 via electrical connections (not shown) extending through the housing 110. The internal electric power supply 140 and controller 150 may be configured to provide an alternating current to the first and second inductor coils 131, 132 independently. This allows the first and second coils 131, 132 to be activated one at a time or simultaneously, depending on the desired heating effect.

In another, alternative, configuration, one of the coils may be an active or drive coil connected to a power supply and the other of the coils may be part of a resonant circuit and act as a resonant coil. This configuration is described further below in relation to FIG. 8.

In the configuration in which both coils receive power directly from a power supply, the first inductor coil 131 may have a first inductance and the second inductor coil 132 may have a second inductance, wherein the first inductance is greater than the second inductance. This means that the strength of the magnetic field generated by the first inductor coil 131 is greater than the strength of the magnetic field generated by the second inductor coil for a given current. With this arrangement, the aerosol-generating device 100 can produce three different heating effects purely by activating the first inductor coil 131 on its own, activating the second inductor coil 132 on its own, or activating both the first inductor coil 131 and the second inductor coil 132 simultaneously.

When the aerosol-generating device 100 is actuated, a high-frequency alternating current is passed through the first inductor coil 131 to generate an alternating magnetic field within the heating zone at the distal end of the chamber 120 of the aerosol-generating device 100. The magnetic field preferably fluctuates with a frequency of between 1 and 30 MHz, preferably between 2 and 10 MHz, for example between 5 and 7 MHz. When an aerosol-generating article 10 is correctly located in the chamber 120, the susceptor element 180 is located within the aerosol-forming substrate 20 of the aerosol-generating article. The alternating field generates eddy currents within the susceptor element 180, which is heated as a result. Further heating is provided by magnetic hysteresis losses within the susceptor element 180. The heated susceptor element 180 heats the aerosol-forming substrate 20 of the aerosol-generating article 10 to a sufficient temperature to form an aerosol. The aerosol may then be drawn downstream through the aerosol-generating article 10 for inhalation by the user. Such actuation may be manually operated or may occur automatically in response to a user drawing on the aerosol-generating article 10, for example by using a puff sensor.

During initiation of the aerosol-generating device, the second inductor coil 132 may be used as a booster coil to reduce the time required for the susceptor element 180 to reach the desired operating temperature. In particular, during initiation of the aerosol-generating device, a high-frequency alternating current is passed through both of the first and second inductor coils 131, 132 to generate an alternating electromagnetic field within the heating zone of the chamber 120 of the aerosol-generating device 100. By activating both coils, the strength of the magnetic field is increased and so too is the rate at which the susceptor element is heated. Once the susceptor element has reached the desired operating temperature, the supply of power to the second inductor coil may be halted. This may facilitate efficient use of the aerosol-generating device. It may also help to prevent overheating.

Between activations, for example between puffs as sensed by a puff sensor, the high-frequency alternating current may be passed through the second inductor coil 132 only. As the inductance of the second inductor coil 132 is lower than that of the first inductor coil 131 the heating effect is less. Consequently, the second inductor coil 132 heats the elongate susceptor element 180 to an elevated temperature which is lower than the operating temperature. Once the aerosol-generating device 100 is reactivated, the high-frequency alternating current is again passed through the first inductor coil 131 only and the temperature of the elongate susceptor element 180 is returned to the desired operating temperature. The elevated temperature maintained by the second inductor coil 132 reduces the time required for the elongate susceptor element 180 to return to the operating temperature, relative to no heating between activations. This may facilitate consistent aerosol properties, particularly at the start of an activation when the temperature may otherwise have been lower. The losses from activation of the second inductor coil are lower than those experienced during activation of the first inductor coil. Thus, activating the second inductor coil between operations, rather than the first inductor coil or both the first and second inductor coils facilitates efficient operation of the aerosol-generating device.

The aerosol-generating device may further comprise a flux concentrator (not shown) positioned around the inductor coil assembly 130 and formed from a material having a high relative magnetic permeability so that the electromagnetic field produced by the inductor coil 130 is attracted to and guided by the flux concentrator. In this manner, the flux concentrator may limit the extent to which the electromagnetic field produced by the inductor coil assembly 130 extends beyond the housing 110 and may increase the density of the electromagnetic field within the chamber 120. This may increase the current generated within the susceptor elements to allow for more efficient heating. Such a flux concentrator may be made from any suitable material or materials having a high relative magnetic permeability. For example, the flux concentrator may be formed from one or more ferromagnetic materials, for example a ferrite material, a ferrite powder held in a binder, or any other suitable material including ferrite material such as ferritic iron, ferromagnetic steel or stainless steel. The flux concentrator is preferably made from a material or materials having a high relative magnetic permeability. That is, a material having a relative magnetic permeability of at least 5 when measured at 25 degrees Celsius, for example, at least 10, at least 20, at least 30, at least 40, at least 50, at least 60, at least 80, or at least 100. These example values may refer to the relative magnetic permeability of the flux concentrator material for a frequency of between 6 and 8 MHz and a temperature of 25 degrees Celsius.

Figure 6:
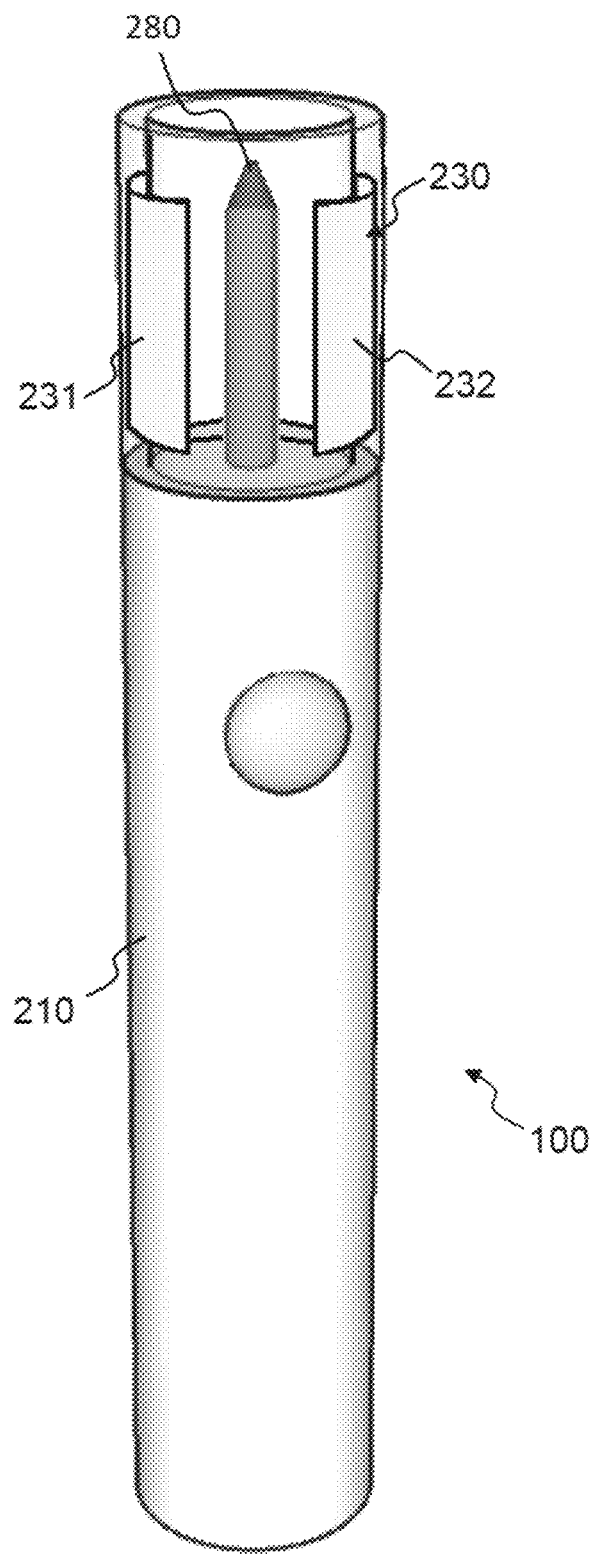
FIG. 6 is a perspective side view of an embodiment of an aerosol-generating device, in which an inductor coil assembly and a susceptor element are also shown.

FIG. 6 illustrates an aerosol-generating device 200 according to a second embodiment.

The aerosol-generating device 200 of the second embodiment is similar in construction and operation to the aerosol-generating device 100 of the first embodiment and where the same features are present, like reference numerals have been used. However, unlike the aerosol-generating device 100 of the first embodiment, the aerosol-generating device 200 has an inductor coil assembly 230 in which the first and second inductor coils 231, 232 are planar coils disposed around part of the circumference of the chamber, on either side of the heating zone. The first and second inductor coils 231, 232 each lie on a curved plane which generally follows the circular shape of the chamber around which they extend. The first and second inductors 231, 232 are arranged such that their respective magnetic axes are parallel and substantially aligned transversely to the longitudinal axis of the chamber 220.

As with the first embodiment described above, in an alternative configuration, one of the coils may be a drive coil and one of the coils may be a resonant coil.

Figure 7:
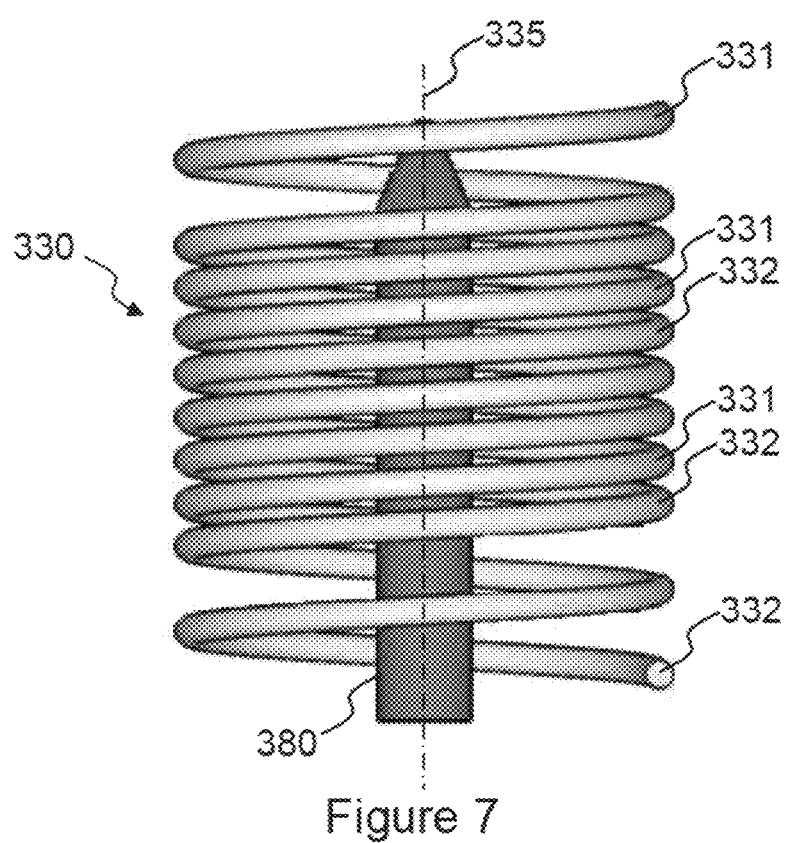
FIG. 7 is a side view of an inductor coil assembly and susceptor element of an embodiment of an aerosol-generating device.

FIG. 7 illustrates an inductor coil assembly and elongate susceptor element of an aerosol-generating device according to a third embodiment. The inductor coil assembly 330 of the third embodiment is similar in construction and operation to the inductor coil assembly of the aerosol-generating device 100 of the first embodiment and where the same features are present, like reference numerals have been used. As with the aerosol-generating device 100 of the first embodiment, the first and second inductor coils 331, 332 are co-wound helical coils which form a combined coil around the heating zone. However, in this embodiment, the first and second inductor coils 331, 332 are co-wound along only part of their respective lengths. In particular, the first inductor coil 331 is co-wound at its distal end and extends proximally of the heating zone and the second inductor coil 332 is co-wound at its proximal end and extends distally of the heating zone.

Thus, the longitudinal positions of the first and second inductor coils relative to the chamber are different, although they overlap in the heating zone. Both of the first and second inductor coils extend beyond the heating zone in a longitudinal direction.

When a high-frequency alternating current is passed through the first inductor coil 331, an alternating magnetic field is generated within the heating zone and within a portion of the chamber which is distal of the heating zone. When a high-frequency alternating current is passed through the second inductor coil 332, an alternating magnetic field is generated within the heating zone and within a portion of the chamber which is proximal of the heating zone.

As with the first embodiment described above, in an alternative configuration, one of the coils may be a drive coil and one of the coils may be a resonant coil.

Figure 8:
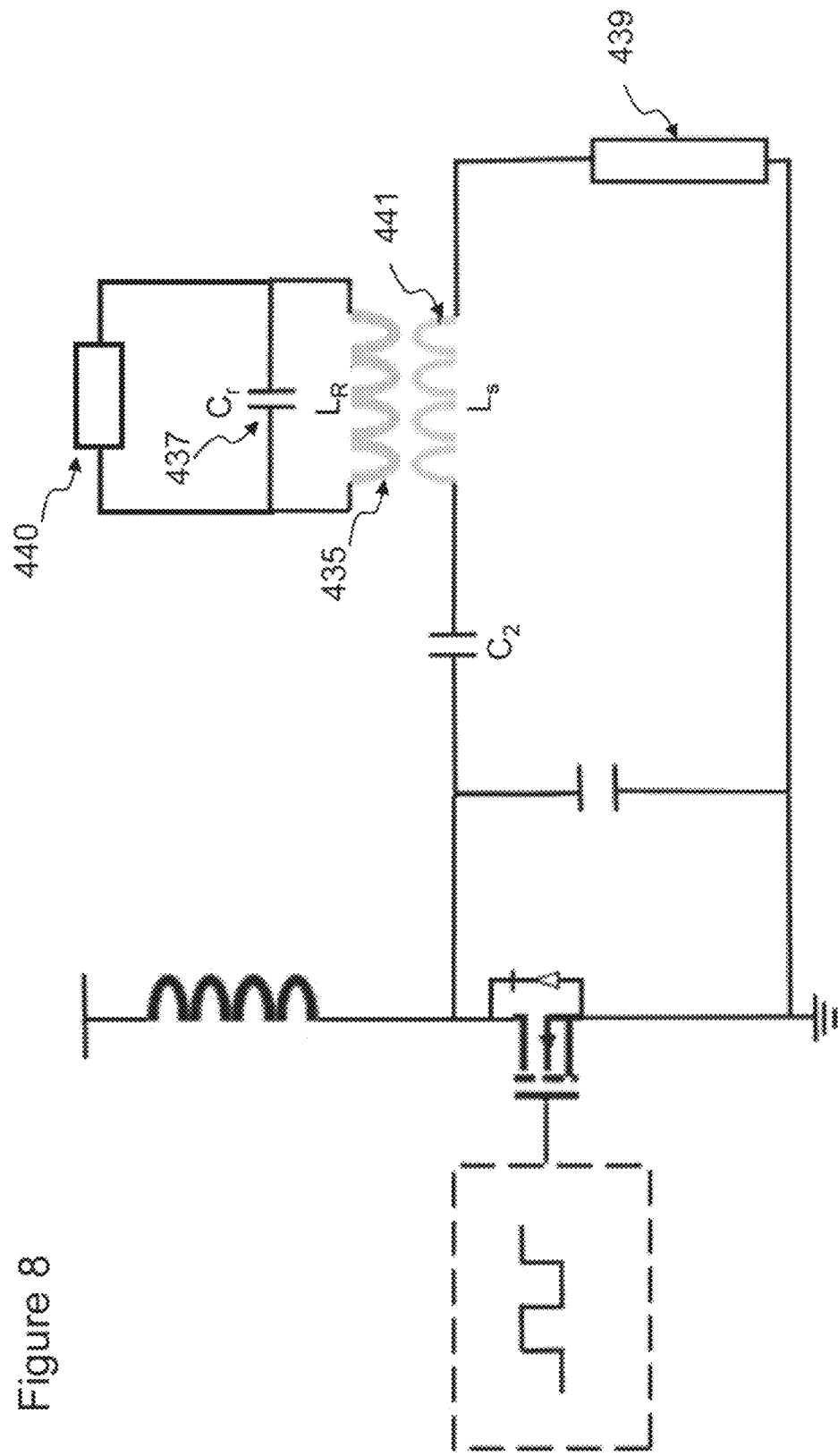
FIG. 8 is a circuit diagram showing electrical connections of a first, drive, coil and a second, resonant, coil for use in an embodiment of an aerosol-generating device.

In an advantageous electrical configuration that may be used in conjunction with any aerosol-generating device or aerosol-generating system described herein, one of the coils may be electrically connected to a power supply and act as an active or drive, coil. The other of the coils may be part of a resonant circuit, along with a capacitor, and act as a resonant coil. FIG. 8. Illustrates a circuit diagram showing such a configuration. As shown, a first coil or drive coil 441, $L_s$, forms part of a class-E inverter. The second, or resonant, coil 435, $L_r$, forms part of a resonant circuit with a resonant capacitor 437, $C_r$. The first coil 441 and second coil 435 form a resonant inductive coupling. The resonant frequencies of the first coil ($F_{res1}$) and the second coil ($F_{res2}$) correspond to the following equation:

$$F_{res1} = 1/2\pi[(L_s C_2)^{1/2}]$$

$$F_{res2} = 1/2\pi[(L_r C_r)^{1/2}]$$

The resonant frequencies of the first coil and the second coil are preferably matched by selecting appropriate values of $L_s$, $C_2$, $L_r$, and $C_r$. By matching the resonant frequencies, the current flow, and therefore magnetic field, can be maximised.

The transistor switch of the Class-E power inverter can be any type of transistor and may be embodied as a bipolar-junction transistor (BJT). More preferably, however, the transistor switch is embodied as a field effect transistor (FET) such as a metal-oxide-semiconductor field effect transistor (MOSFET) or a metal-semiconductor field effect transistor (MESFET).

The first coil 441 operates at a resonance frequency with a low Q factor, for example a Q factor of between 5 and 7. Current flowing through the first coil 441 produces a magnetic field. This magnetic field induces a current in the resonant coil 435, which changes the resonant capacitor 437. As the direction of current flow changes due to the AC supply, the magnetic field reverses direction. The resonant capacitor discharges, causing current to flow through the resonant coil 435 and contribute to the magnetic field. Use of the resonant circuit allows impedance to be modified. For example, one result is that more current is flowing through the two coils than would flow through one coil, and the Q factor is effectively increased. The magnetic field strength is proportional to current and is, therefore, increased by the addition of the resonant circuit. This leads to more efficient heating of a susceptor for a given power supply in an aerosol-forming article.

The presence of a susceptor in the alternating magnetic field produced by the first coil 441 and the second coil 435 produces a resistance in the electrical circuits associated with the first and second coil. This resistance is usually termed an equivalent resistance, as there is not a real electrical component in the circuit. Equivalent resistance due to the presence of a susceptor in the driving circuit is depicted by a first resistor 439, and equivalent resistance due to the presence of the susceptor in the resonant circuit is depicted by a second resistor 440.

The exemplary embodiments described above are not intended to limit the scope of the claims. Other embodiments consistent with the exemplary embodiments described above will be apparent to those skilled in the art.

The invention claimed is:

1. An aerosol-generating device that uses inductive heating, comprising:
   a housing having a chamber configured to receive at least a portion of an aerosol-forming article;
   a first inductor coil disposed at least partially around, or adjacent to, the chamber; and
   a second inductor coil disposed at least partially around, or adjacent to, the chamber,
   wherein the first inductor coil is part of a first resonant circuit having a first resonant frequency and the second inductor coil forms part of a second resonant circuit having a second resonant frequency, the first resonant frequency and the second resonant frequency being different.

2. The aerosol-generating device according to claim 1, wherein the first inductor coil and the second inductor coil have different inductance values.

3. The aerosol-generating device according to claim 1, further comprising a power supply and a controller configured to provide alternating current to each of the first inductor coil and the second inductor coil independently of each other.

4. The aerosol-generating device according to claim 3, wherein the controller is further configured to supply current to one or both of the first inductor coil and the second inductor coil intermittently following activation of the aerosol-generating device.

5. The aerosol-generating device according to claim 3, wherein the controller is further configured to vary independently an amplitude of the alternating current provided to each of the first inductor coil and the inductor second coil.

6. The aerosol-generating device according to claim 3, wherein the controller is further configured so that during operation the current provided to one of the first and the second inductor coils is stopped so that the other inductor coil of the first and the second inductor coils provides a majority of a heating effect.

7. The aerosol-generating device according to claim 1, wherein the first inductor coil and the second inductor coil are helical.

8. The aerosol-generating device according to claim 1, wherein the chamber has an open end in which an aerosol-generating article is inserted.

9. The aerosol-generating device according to claim 1, wherein a longitudinal position of the first inductor coil relative to the chamber is different from a longitudinal position of the second inductor coil relative to the chamber.

10. The aerosol-generating device according claim 1, further comprising a DC/AC inverter configured to convert a DC current supplied by a DC power supply to an alternating current.

11. The aerosol-generating device according to claim 1, further comprising a susceptor element projecting into the chamber, wherein the susceptor element is inductively heatable by one or both of the first and the second inductor coils to heat at least a portion of an aerosol-forming substrate where the aerosol-forming substrate is at least partially received in the chamber.

12. The aerosol-generating device according to claim 11, wherein the susceptor element is hollow.

13. The aerosol-generating device according to claim 11, wherein the susceptor element is in a form of a rod.

14. The aerosol-generating device according to claim 11, wherein the susceptor element has a circular cross-section with a diameter of 5 millimetres.

15. An aerosol-generating system comprising an aerosol-generating device according to claim 1 and an aerosol-generating article comprising an aerosol-forming substrate, wherein the aerosol-generating article is configured for use with the aerosol-generating device.

16. The aerosol-generating system according to claim 15, wherein in operation the aerosol-generating article is partially received in the chamber.

17. The aerosol-generating system according to claim 15, wherein in operation the aerosol-generating article is entirely received in the chamber.

18. The aerosol-generating system according to claim 17, wherein the aerosol-generating article comprises a mouthpiece.

19. The aerosol-generating system according to claim 16, wherein the aerosol-generating article comprises a filter plug.

20. The aerosol-generating system according to claim 19, wherein the filter plug is disposed at a downstream end of the aerosol-generating article.

21. The aerosol-generating system according to claim 19, wherein the filter plug is a cellulose acetate filter plug.

22. The aerosol-generating system according to claim 19, wherein the filter plug has a length of between 5 millimetres and 10 millimetres.

23. The aerosol-generating system according to claim 19, wherein the aerosol-generating article further comprises a separation between the aerosol-forming substrate and the filter plug.

24. The aerosol-generating system according to claim 23, wherein the separation is 25 millimetres.

25. The aerosol-generating system according to claim 19, wherein the aerosol-forming substrate comprises homogenised tobacco material.

26. The aerosol-generating system according to claim 19, wherein the aerosol-forming substrate comprises at least one aerosol-former.

27. The aerosol-generating system according to claim 26, wherein the aerosol-former comprises glycerine.

28. The aerosol-generating system according to claim 26, wherein the aerosol-forming substrate further comprises homogenised tobacco material having an aerosol former content of equal to or greater than 5% by weight on a dry weight basis.

29. The aerosol-generating system according to claim 15, wherein the aerosol-generating article has a total length between 30 millimetres and 100 millimetres.

30. The aerosol-generating system according to claim 15, wherein the aerosol-generating article has an external diameter of 5 millimetres.

\* \* \* \* \*